Oct. 17, 1944.　　　　J. H. ONIONS　　　　2,360,443
APPARATUS FOR MANUFACTURING GRINDING TOOLS
Filed July 2, 1942
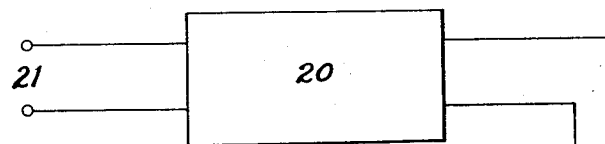
Fig. 1.
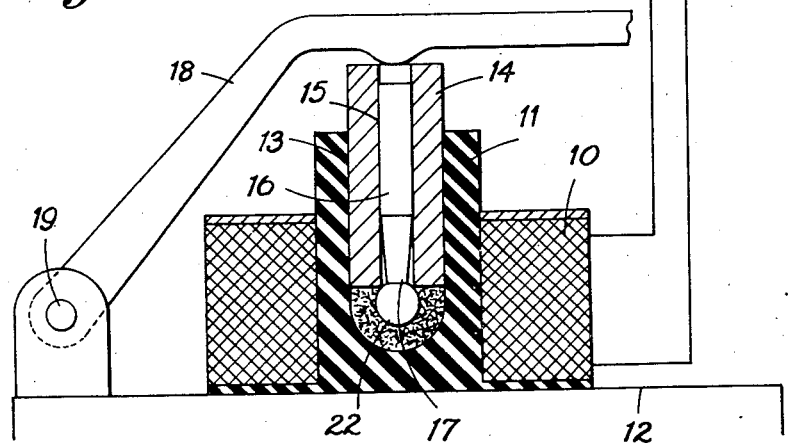
Fig. 2.
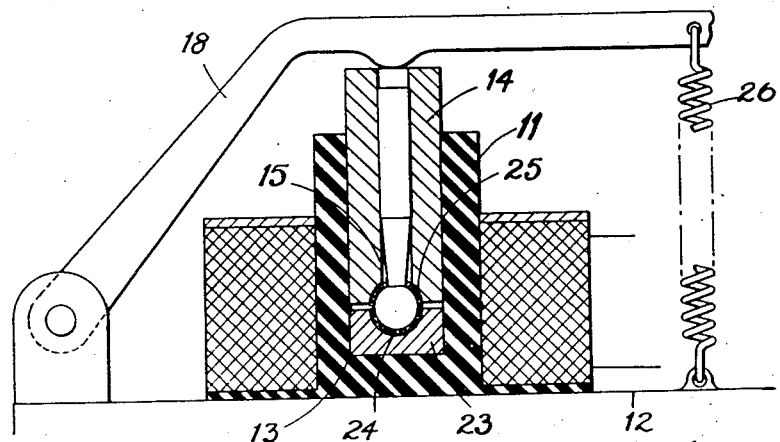
Inventor
John H. Onions
by [signature] Atty.

Patented Oct. 17, 1944

2,360,443

UNITED STATES PATENT OFFICE 2,360,443

APPARATUS FOR MANUFACTURING GRINDING TOOLS

John Henry Onions, Coventry, England

Application July 2, 1942, Serial No. 449,503
In Great Britain July 12, 1941

3 Claims. (Cl. 219—13)

This invention relates to apparatus for manufacturing grinding tools, and more particularly to dental tools such as drills and the like employed for removing decayed matter from teeth, and enlarging cavities therein preparatory to filling, such grinding tools being formed by partially embedding fragments of diamond or other hard material in the surface of a metal form or tool body.

The object of the invention is to provide an improved apparatus for manufacturing a grinding tool of the kind referred to.

It is known that the surface layer of a magnetic metal body can be brought to a state of high plasticity, or even melted, by the application of electric current of high frequency to an induction coil surrounding the metal body, and the present invention utilises this known phenomenon in the manufacture of a grinding tool.

According to the invention, a tool form or body of magnetic metal is inserted within an induction coil to which is supplied alternating electric current of sufficiently high frequency at least to bring the surface of the said tool form or body to a plastic condition, the fragments of hard material being then pressed into the surface of the tool form and the latter allowed to cool.

The tool form or body may be mounted in a split die conforming in shape to the tool form, the fragments of hard material being supported between the surface of the tool form and the die, the tool being inserted with the die into the induction coil and the parts of the die being urged towards each other when the surface of the tool has been rendered plastic, to press the fragments into the said surface.

Alternatively, the tool form or body may be mounted in a container packed with fragments of hard material surrounding the tool, and may be inserted with the container into the induction coil, opposite walls of the container being urged towards each other when the surface of the tool has been rendered plastic, to press the fragments into the said surface.

The tool form or body may be inserted within the induction coil, heated, withdrawn therefrom whilst its surface is in a plastic condition, and inserted into a surrounding member containing fragments of hard material to which pressure is applied by said containing member to press them into the plastic surface of the tool.

Apparatus for carrying out the process, according to the invention, may comprise an induction coil, means for supporting a tool form or body within the induction coil, means for locating fragments of hard material in contact with the surface of the tool form or body, and means for pressing said fragments into the said surface when the latter has been rendered plastic. The means for locating the fragments of hard material in position may comprise a substantially cylindrical container closed by a plunger apertured to receive the tool shank, or may comprise a split clamp conforming in shape to the head of the tool form or body.

The invention is hereinafter described with reference to the accompanying drawing, in which—

Fig. 1 is a diagram illustrating one method of carrying out the invention; and

Fig. 2 is a view of a split clamp which may be used instead of the container shown in Fig. 1 for pressing the fragments of abrasive material into the tool body.

Referring to Fig. 1, the induction coil 10 is wound on a former 11 comprising a block of insulating material such as a synthetic resinous molding material, the former 11 being mounted on a support 12. A cylindrical recess 13 is formed in the former 11 and is adapted to be closed by a plunger 14, the plunger having a hole 15 formed therein to receive the shank 16 of a tool 17. A lever 18 pivoted at 19 on the support 12 is adapted to engage with the outer end of the plunger 14. The induction coil 10 is connected to an oscillator 20 receiving alternating current from a source of supply indicated at 21, the oscillator being designed to convert the supply current to a very high frequency, the frequency preferably being adjustable. The recess 13 has a hemispherical lower end, into which the head of the tool 17 projects.

To prepare a grinding tool, a tool body 17 is prepared, being made preferably from steel, although it may be made from any other magnetic material. The body may be coated with a low melting point metal such as zinc, which will be readily melted by heat transmitted thereto from the magnetic material. The tool body is inserted in the plunger 14 with its head 22 projecting from the end thereof. The lower end of the recess 13 is filled with fragments of abrasive material, such as diamond chips, and the plunger is then inserted in the recess, and lightly pressed in to force the head into the mass of fragments until the latter entirely fill the space below the plunger 14. Current is then fed to the oscillator, inducing an alternating current of very high frequency in the induction coil. The surface of the tool head 22 is thus very much heated, and is rendered highly plastic or even melted. Increased pressure is then exerted on the lever 18 to apply pressure to the diamond chips in the recess, and force those in contact with the surface of the tool head partially to embed themselves in the plastic or liquid surface layer of metal. The current is switched off immediately before or after the application of pressure to the diamond chips, and the tool is then allowed to cool before being removed from the recess 13.

Fig. 2 shows an alternative method of supporting the diamond chips on the surface of the tool head before they are embedded therein. A block 23 having a part-spherical recess 24 is supported in the lower end of the recess 13, the recess 24 being of slightly greater radius than the tool head. The plunger 14 is formed with a part-spherical recess 25 of the same radius as the recess 24, surrounding the inner end of the hole 15. A layer of diamond chips is spread over the surface of the tool head or over the spherical surface of the split clamp formed by the block 23 and plunger 14, the chips being temporarily held in place by a liquid or viscous medium with which they are mixed, and the various parts are inserted in the recess 13. As in the previous example, pressure is applied to the plunger 14 by the lever 18 when the tool head has been sufficiently heated, to force the fragments partially to embed themselves in the surface of the tool head.

The surface of the tool head returns to a hard condition when it is cooled, and the diamond chips are held firmly in position, so as to provide a permanent rough surface thereon. The cooling may be controlled in any convenient manner to provide a predetermined rate of cooling, thus controlling the final properties of the surface of the tool.

For example, water may be injected by any suitable means to the recess 13 around the tool head, to cool the latter rapidly. By using a suitable steel for the tool body, case hardening of the head may be thus effected.

As shown in Fig. 2, a spring 26 may be arranged between the lever 18 and the base 12, to exert a pull on the lever which, when the surface of the tool is softened, causes the fragments of abrasive material to be forced thereinto. The movement of the lever may be arranged to cut off the supply of current to the oscillator after a predetermined movement, so that the process is automatically controlled, and the operator has merely to insert the tool blank and switch on the current.

The former of the induction coil may, of course, be separate from the block in which the recess to receive the tool is formed, the former being conveniently mounted so as to surround the block.

The container or split clamp by which the fragments of abrasive material are forced into the surface of the tool head need not be mounted in the induction coil. The tool may be heated in the induction coil and then transferred to the container or split clamp whilst its surface is in a plastic or liquid condition.

What I claim is:

1. Apparatus for manufacturing a grinding tool having a substantially continuous layer of fragments of hard material over at least one surface of a body of magnetic metal, comprising relatively movable parts defining between them a smooth-walled chamber, one of said parts being formed for positioning the tool body with the surface to which the layer of fragments of hard material is to be applied in said chamber, an induction coil surrounding said chamber, and means for producing relative movement of said parts to reduce the volume of said chamber, whereby fragments of hard material located in the said chamber are pressed into the heated surface of the tool body when the said surface is heated to at least a plastic state by the application of alternating electric current to an induction coil.

2. Apparatus for manufacturing a grinding tool including a head supporting a substantially continuous layer of fragments of hard material and a shank, the head and shank being formed as an integral unit from magnetic metal, said apparatus comprising relatively movable parts defining between them a chamber substantially larger than the tool head, one of said parts being formed for receiving the tool shank and locating the tool with its head in the said chamber, an induction coil surrounding said chamber, and means for producing relative movement of said parts to reduce the volume of said chamber and exert pressure on a mass of fragments of hard material filling the space therein not occupied by the tool head, whereby a layer of said fragments is pressed into the surface of the tool head when the said surface is heated to at least a plastic state by the application of alternating electric current to the induction coil.

3. Apparatus for manufacturing a grinding tool including a head supporting a substantially continuous layer of fragments of hard material and a shank, the head and shank being formed as an integral unit from magnetic metal, said apparatus comprising a recessed block, an induction coil surrounding the block, a split clamp conforming in shape to the head of the tool and of such a size relative thereto as to confine a single layer of fragments of hard material between itself and the tool head, the clamp having its parts located in the recess in the block, one of the clamp parts being formed to receive the tool shank so that the head is positioned in the clamp, and means for producing relative movement of said clamp parts, whereby fragments of hard material disposed in a single substantially continuous layer between the tool head and the clamp are pressed into the surface of the tool head when the said surface is heated to at least a plastic state by the application of alternating electric current to the induction coil.

JOHN HENRY ONIONS.